3,394,768
FATTY ALCOHOLS AS PERFORMANCE BOOSTERS AND FOAM STABILIZERS WITH FATTY ALCOHOL SULFATE SALTS
Lowell R. Chocola, Chicago, Ralph P. Arthur, Addison, and Samuel Shore, Roselle, Ill., assignors to The Richardson Company, Melrose Park, Ill., a corporation of Ohio
No Drawing. Filed Oct. 4, 1965, Ser. No. 492,874
6 Claims. (Cl. 175—69)

ABSTRACT OF THE DISCLOSURE

A method of producing improved water based foams useful for air-foam drilling is carried out by incorporating a small amount of mixed fatty alcohols containing 10–16 carbon atoms with solutions of basic salts of mixed sulfated fatty alcohols containing 12–15 carbon atoms.

---

This invention relates to the use of basic salts of mixed sulfated alcohols in air-foam drilling and more particularly to improved air-foams produced through the addition of mixed fatty alcohols to the sulfated alcohols.

Air-foam drilling is a relatively new technique developed to remove cuttings from the vicinity of the drill bit in drilling operations. Air-foam drilling differs from conventional drilling in that foam produced from an aqueous solution of the surfactant and compressed air instead of drilling mud is used to suspend the cuttings and remove them from the drill bit. Air-foam drilling is particularly advantageous in operations which produce the larger openings in the earth for such purposes as underground explosive tests and housings for weapon systems, since the volumes of suspending fluid required prohibit the use of drilling mud.

As indicated above, foams used in the air-foam drilling operations should be both strong and stable so as to form suspensions of the solid cuttings and to carry them away from the drill bit, Not all foams exhibit these properties to an acceptable extent. In addition, some foaming agents are quite costly.

Therefore, one object of this invention is the development of foam compositions which exhibit strength and stability and are useful in air-foam drilling.

Another object is the development of low cost foaming agents.

Other objects will become apparent from the detailed description below.

We have discovered that low cost basic salts of mixed, sulfated fatty alcohols with 10–16 carbon atoms and, particularly, those derivatives containing the odd number of carbon atoms can be utilized to produce air-foam compositions if mixed, fatty alcohols with 10–16 carbon atoms including the odd numbered alcohols are added in small amounts to the sulfated fatty alcohol compositions. The resultant combination is particularly useful in water based foams and preferably in systems utilizing tap or other relatively soft water.

Briefly, the invention is directed to a method of producing improved water based foams useful for air-foam drilling from aqueous solutions containing basic salts of mixed, sulfated alcohols with 10–16 carbon atoms, which comprises introducing a small amount of mixed fatty alcohols with 10–16 carbon atoms to improve the properties of stability and strength of the foam. It is also directed to a method of air-foam drilling in which suspensions of silicon based, inorganic particles are removed from the vicinity of the drill bit by use of these water based foams. In addition, the invention is directed to aqueous solutions of the combination of the salts and mixed fatty alcohols.

In the invention, low cost basic salts of mixed fatty sulfated alcohol with 10–16 carbon atoms are utilized as the foaming agent. These salts include the amine and alkali salts such as ammonium, alkanol amine, sodium, potassium salts, and the like, with ammonium salts being preferred. The sulfated fatty alcohols contain 10–16 carbon atoms and preferably have an average chain length of 13–14 carbon atoms. Although these salts are somewhat ineffective in producing the required properties in the foams by themselves, their ability to produce the required foams is considerably enhanced by the small addition of mixed fatty alcohols with 10–16 carbon atoms. Preferably the fatty alcohols contain an average chain length of 13–14 carbon atoms.

The combination of the salts and the mixed fatty alcohols is a particularly effective additive for water based systems utilizing tap or other relatively soft water. When salt or hard water is utilized, the improvement is much less striking.

A particularly advantageous composition in producing air-foams for drilling operations comprises an aqueous solution of the defined salts of the mixed sulfated fatty alcohols with 10–16 carbon atoms and a small amount of mixed fatty alcohols with 10–16 carbon atoms, the small amount being 2–3 weight percent based on the weight of ammonium salts of mixed sulfated fatty alcohols with an average of 13–14 carbon atoms. This particular percentage has been found to be unusually effective in contrast to other less effective weight percentages of 1 and 4.

The above described foams are useful in the method of air-foam drilling operations in which suspensions of silicon based, inorganic particles are removed from the vicinity of the drill bit. This method comprises introducing an air-foam in the vicinity of a drill bit to form a suspension of the particles in the foam, and removing the suspension together with the particles from the vicinity of the drill bit. The foam is as described above.

One of the commercially prescribed tests used in determining the effectiveness of the foaming additives measures the ability of the foam to suspend silicon based, inorganic particles such as sand or carborundum. In the test, the sand or carborundum is added to 100 cc. of distilled water at a temperature of 24–26° C. The combination is mixed with a Hamilton Beach Mixer at low speed for about 60 seconds, after which the foam is carefully poured from the beaker into a 500 cc. graduated cylinder. The graduated cylinder is allowed to remain undisturbed for a time period in the order of one-half hour with readings of the amount of particles which have separated being taken at various time intervals and always after the one-half hour period.

In the following example, tests were made to determine the effectiveness of the foaming additives useful in this invention, using carborundum as the inorganic particles. It is to be understood that the example is for illustrative purposes only and does not purport to be wholly definitive to conditions or scope.

In the test, varying percentages of the mixed fatty alcohols were added to a 35 weight percent solution of the ammonium salts of sulfated $C_{12}$–$C_{15}$ fatty alcohols with the volume of foam generated, the rate of separation of carborundum, and the foam drainable after 30 minutes being recorded. The results are shown in the following Table I:

TABLE I

| Pct. Fatty Alcohol Added | Chain Length of Added Fatty Alcohol | Volume of Foam Generated (cc.) | Rate of Separation of Carborundum (cc.) | | | | Foam Drainage After 30 Min. (cc.) |
|---|---|---|---|---|---|---|---|
| | | | 5 Min. | 10 Min. | 15 Min. | 30 Min. | |
| None | | 575 | 25 | | | 35 | 105 |
| 1.0 | 20% $C_{12}$; 30% $C_{13}$; 30% $C_{14}$; 20% $C_{15}$ | 590 | 15 | | | 30 | 90 |
| 2.0 | 20% $C_{12}$; 30% $C_{13}$; 30% $C_{14}$; 20% $C_{15}$ | 580 | 0 | | | 15 | 70 |
| 4.0 | 20% $C_{12}$; 30% $C_{13}$; 30% $C_{14}$; 20% $C_{15}$ | 555 | 0 | | | 25 | 60 |
| 6.0 | 20% $C_{12}$; 30% $C_{13}$; 30% $C_{14}$; 20% $C_{15}$ | 545 | 0 | | | 20–25 | 60 |
| 2.0 | $C_8$ | 580 | 25–30 | | 35–40 | 40 | 80 |
| 2.0 | $C_{10}$ | 585 | 25–30 | | 30–35 | 30–35 | 75 |
| 2.0 | $C_{12}$ | 575 | 3 | 15 | | 20–25 | 70 |
| 2.0 | $C_{14}$ | 575 | 0 | 2 | | 15 | 60 |
| 2.0 | $C_{16}$ | 570 | 5–10 | | | | |
| 2.0 | $C_{18}$ | 585 | 25–30 | | 30 | 30 | 60 |
| 2.0 | 55% $C_{12}$; 43% $C_{14}$ | 555 | 3 | | 15–20 | 20 | 70 |
| 2.0 | 60% $C_{12}$; 25% $C_{14}$; 11% $C_{16}$ | 585 | 3 | | 15 | 15 | 68 |

The above results demonstrate that when the mixed fatty alcohols were absent, the ammonium salts of the sulfated fatty alcohols permitted relatively significant separation rates with the carborundum and relatively large amounts of foam drainage. The results also demonstrate that with the addition of the mixed fatty alcohols of 12–15 carbon atoms, the rate of separation of carborundum was significantly improved together with the foam drainage. Particularly significant were the results for the 2 percent concentrations of mixed fatty alcohols where the rate of separation was 0 in 5 minutes and only 15 at 30 minutes in contrast with respective values of 15 and 30 for 1 percent concentrations and 0 and 25 for 4 percent concentrations. The results also show that from the 2 percent concentrations of the $C_{14}$ fatty alcohol and the 2 percent concentrations of the latter two mixtures of fatty alcohols, that the mixed fatty alcohols perform equivalent to the more expensive pure $C_{14}$ alcohol.

The combination of mixed fatty alcohols and the salts of mixed sulfated fatty alcohols described above is particularly useful in air-foam drilling operations. However, this system is also useful in the manufacture of wallboard and concrete where air-foam agent is used for the entrapment of air, thus reducing the density of the product, and in the manufacture of dishwashing compounds and shampoo formulations.

We claim:
1. A composition useful in producing air-foams for drilling operations, consisting essentially of an aqueous solution of basic salts of mixed sulfated fatty alcohols with 12–15 carbon atoms and about 2–3 weight percent in respect to the sulfated alcohols of mixed fatty alcohols with 12–16 carbon atoms.

2. The composition of claim 1 wherein the aqueous solution is based on soft water.

3. A method of air-foam drilling in which silicon based, inorganic particles are removed from the vicinity of a drill bit being used to produce openings in the earth, which method comprises introducing an airfoam into the vicinity of the drill bit to form a suspension of said particles in said foam, and removing said suspension from the vicinity of the drill bit, said foam being produced from a water system containing as the foaming agents, basic salts of mixed sulfated fatty alcohols with 12–15 carbon atoms; and as a foam enhancing agent, mixed fatty alcohols with 12–16 carbon atoms to improve the stability and strength of the foams, said mixed alcohols being present in about 2–3 weight percent in respect to the mixed sulfated alcohols.

4. The method of claim 3 wherein said salts are alkali metal salts.

5. The method of claim 3 wherein said salts are ammonium salts.

6. The method of claim 3 wherein the foam is produced from a soft water system.

References Cited

UNITED STATES PATENTS
3,155,178 11/1964 Kirkpatrick et al.
3,186,943 6/1965 Barthauer _____ 252—3

FOREIGN PATENTS
485,194 5/1938 Great Britain.

LEON D. ROSDOL, *Primary Examiner.*

R. D. LOVERING, *Assistant Examiner.*